United States Patent
Graf et al.

(10) Patent No.: US 11,183,960 B1
(45) Date of Patent: Nov. 23, 2021

(54) FAIL-SAFE MOTOR CONTROL ARCHITECTURE FOR OPEN-END WINDING MOTORS

(71) Applicant: HONEYWELL INTERNATIONAL INC., Morris Plains, NJ (US)

(72) Inventors: Miroslav Graf, Brno (CZ); Petr Hanus, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/004,865

(22) Filed: Aug. 27, 2020

(51) Int. Cl.
*H02P 25/18* (2006.01)
*H02P 27/06* (2006.01)

(52) U.S. Cl.
CPC ............ *H02P 25/18* (2013.01); *H02P 27/06* (2013.01); *H02P 2207/01* (2013.01); *H02P 2207/05* (2013.01)

(58) Field of Classification Search
CPC ...... H02P 25/18; H02P 27/06; H02P 2209/03; H02P 27/04
See application file for complete search history.

(56) References Cited

U.S. PATENT DOCUMENTS

| | | | |
|---|---|---|---|
| 7,294,984 B2 | 11/2007 | Urakabe et al. | |
| 8,258,732 B2* | 9/2012 | Iwaji | H02P 6/20 |
| | | | 318/400.11 |
| 9,252,698 B2* | 2/2016 | Kume | H02P 6/08 |
| 9,543,879 B2* | 1/2017 | Toliyat | H02P 29/60 |
| 2006/0028161 A1* | 2/2006 | Yamamoto | H02P 6/10 |
| | | | 318/432 |
| 2013/0320903 A1 | 12/2013 | Aalund et al. | |
| 2021/0152108 A1* | 5/2021 | Sarikhani | H02P 6/182 |

FOREIGN PATENT DOCUMENTS

| | | |
|---|---|---|
| JP | 2017124728 A | 7/2017 |
| WO | 02/089306 A1 | 11/2002 |

* cited by examiner

*Primary Examiner* — Thai T Dinh
(74) *Attorney, Agent, or Firm* — Lorenz & Kopf, LLP (57) ABSTRACT

A motor control system includes a multi-phase motor, a multi-phase inverter circuit, a plurality of controllable switches, a plurality of sensors, and a monitor circuit. Each controllable switch is coupled in series between a second terminal of the motor and a common winding node and is responsive to switch commands to operate in either a first switch mode or a second switch mode. The monitor circuit is responsive to sensor signals to determine when one or more of the sensed motor state variables attains a predetermined threshold magnitude and when one or more of the sensed motor state variables attains the predetermined threshold magnitude, to supply a switch command to one or more of the controllable switches that causes the one or more controllable switches to operate in the second switch mode.

20 Claims, 3 Drawing Sheets

FIG. 3

FAIL-SAFE MOTOR CONTROL ARCHITECTURE FOR OPEN-END WINDING MOTORS

TECHNICAL FIELD

The present disclosure generally relates to alternating current motor control, and more particularly relates to a fail-safe motor control architecture for open-end winding motors.

BACKGROUND

Motors are increasingly used in various end-use environments, including various aircraft, vehicle, and industrial environments, to drive various system components, rather than presently or previously used pneumatic or hydraulic motors or other devices. For many of these end-use environments, guidelines have been established for system design to accommodate postulated, yet highly unlikely events, such as a component within the system becoming unavailable or otherwise inoperable. Unfortunately, such guidelines can lead to systems with increased complexity, weight, and size.

Hence, there is a need for a motor control system that can accommodated postulated events, such as components becoming unavailable or otherwise inoperable, that does not increase system complexity, weight, and size. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a motor control system includes a multi-phase motor, a multi-phase inverter circuit, a plurality of controllable switches, a plurality of sensors, and a monitor circuit. The multi-phase motor includes a rotor and a plurality of stator windings. Each stator winding is associated with a different phase and includes a first terminal and a second terminal. The multi-phase inverter circuit is coupled to the first terminal of each of the stator windings and is responsive to motor command signals to controllably couple the first terminal of one or more of the stator windings to either a power source or a circuit common node. Each controllable switch is associated with a different one of the second terminals and is coupled in series between its associated second terminal and a common winding node. Each controllable switch is responsive to switch commands to operate in either a first switch mode, in which each controllable switch electrically couples the second terminal of its associated stator winding to the common winding node, or a second switch mode, in which each controllable switch electrically isolates the second terminal of its associated stator winding from the common winding node. Each sensor is configured to sense a motor state variable and supply a sensor signal representative of the sensed motor state variable. The monitor circuit is coupled to each of the controllable switches and to each of the sensors. The monitor circuit is responsive to each of the sensor signals to: determine when one or more of the sensed motor state variables attains a predetermined threshold magnitude, and when one or more of the sensed motor state variables attains the predetermined threshold magnitude, to supply a switch command to one or more of the controllable switches that causes the one or more controllable switches to operate in the second switch mode.

In another embodiment, a motor control system includes a three-phase motor, a three-phase inverter circuit, a plurality of controllable switches, a plurality of sensors, and a monitor circuit. The three-phase motor includes a rotor and a plurality of stator windings. Each stator winding is associated with a different phase and includes a first terminal and a second terminal. The three-phase inverter circuit is coupled to the first terminal of each of the stator windings. The three-phase inverter circuit is responsive to motor command signals to controllably couple the first terminal of one or more of the stator windings to either a power source or a circuit common node. Each controllable switch is associated with a different one of the second terminals and is electrically coupled in series between its associated second terminal and a common winding node. Each controllable switch is responsive to switch commands to operate in either a first switch mode, in which each controllable switch electrically couples the second terminal of its associated stator winding to the common winding node, or a second switch mode, in which each controllable switch electrically isolates the second terminal of its associated stator winding from the common winding node. Each sensor is configured to sense a motor state variable and supply a sensor signal representative of the sensed motor state variable. The monitor circuit is coupled to each of the controllable switches and to each of the sensors. The monitor circuit is responsive to each of the sensor signals to determine when one or more of the sensed motor state variables attains a predetermined threshold magnitude and: (i) when none of the sensed motor state variables has attained the predetermined threshold magnitude, to supply a switch command each of the controllable switches that causes each of the controllable switches to operate in the first switch mode, and (ii) when one or more of the sensed motor state variables attains the predetermined threshold magnitude, to supply a switch command to one or more of the controllable switches that causes the one or more controllable switches to operate in the second switch mode.

In yet another embodiment, a motor control system includes a three-phase motor, a three-phase inverter circuit, a plurality of controllable switches, a plurality of sensors, and a monitor circuit. The three-phase motor includes a rotor and a plurality of stator windings. Each stator winding is associated with a different phase and includes a first terminal and a second terminal. The three-phase inverter circuit is coupled to the first terminal of each of the stator windings and is responsive to motor command signals to controllably couple the first terminal of one or more of the stator windings to either a power source or a circuit common node. The three-phase inverter circuit includes a first pair of series-connected switches, a second pair of series-connected switches, and a third pair of series-connected switches. The first terminal of each stator winding is connected between a different one of the first, second, and third pair of series-connected switches. Each controllable switch is associated with a different one of the second terminals and is electrically coupled in series between its associated second terminal and a common winding node. Each controllable switch is responsive to switch commands to operate in either a first switch mode, in which each controllable switch electrically couples the second terminal of its associated stator winding to the common winding node, or a second switch mode, in which each controllable switch electrically isolates the second terminal of its associated stator winding from the common winding node. Each sensor is configured to sense a motor state variable and supply a sensor signal representative of the sensed motor state variable. The monitor circuit is coupled to each of the controllable switches and to each of the sensors. The monitor circuit is responsive to each of the sensor signals to determine when one or more of the sensed motor state variables attains a predetermined threshold magnitude and: (i) when none of the sensed motor state variables has attained the predetermined threshold magnitude, to supply a switch command each of the controllable switches that causes each of the controllable switches to operate in the first switch mode, and (ii) when one or more of the sensed motor state variables attains the predetermined threshold magnitude, to supply a switch command to one or more of the controllable switches that causes the one or more controllable switches to operate in the second switch mode.

Furthermore, other desirable features and characteristics of the motor control system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
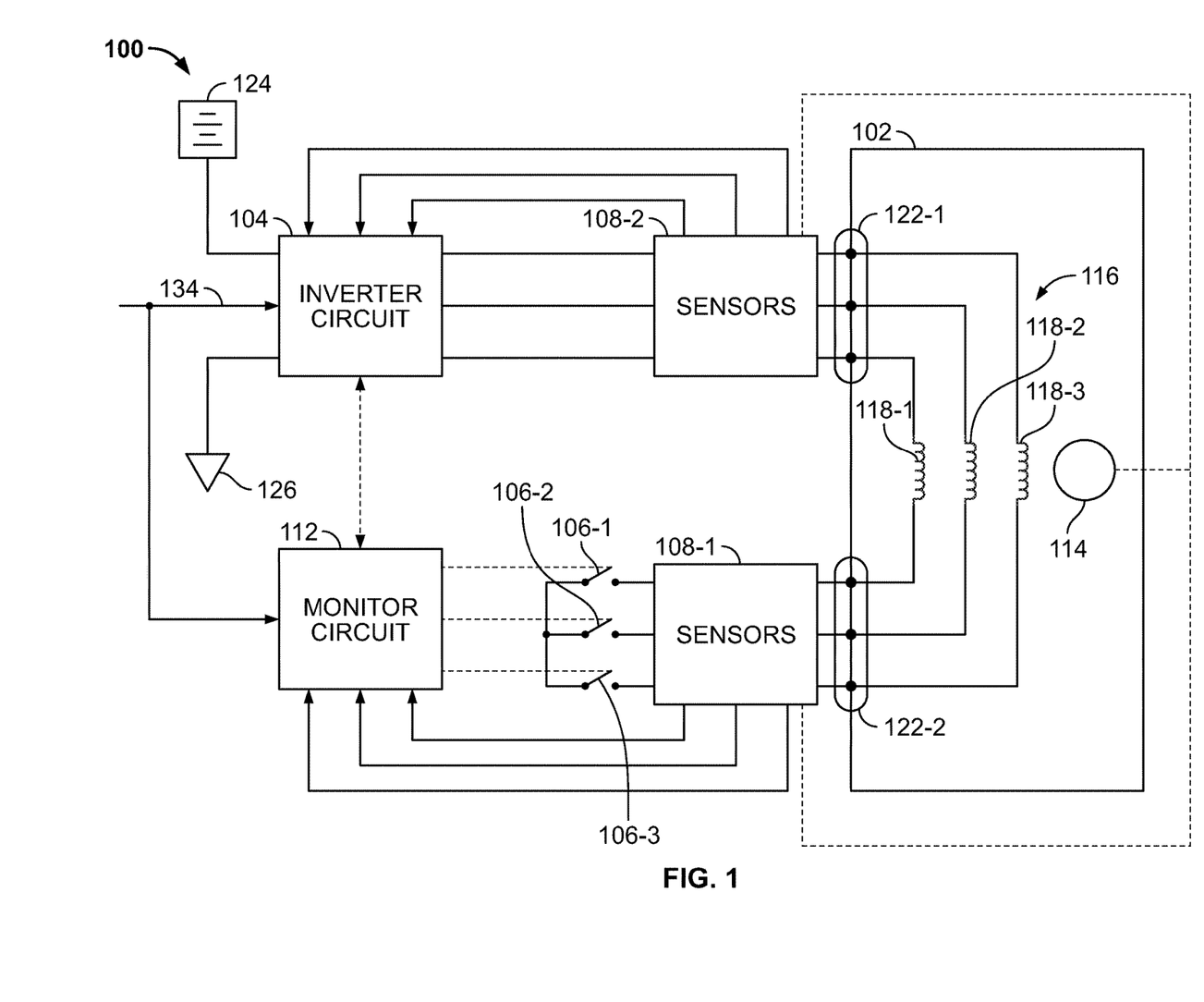
FIG. 1 depicts a functional block diagram of one embodiment of a motor control system.

Referring now to FIG. 1, a functional block diagram of one embodiment of a motor control system 100 is depicted. The depicted system 100 includes a multi-phase motor 102, a multi-phase inverter circuit 104, a plurality of controllable switches 106, a plurality of sensors 108, and a monitor circuit 112. The multi-phase motor 102 includes a rotor 114 and a plurality of stator windings 116. The motor 102 may be implemented as any one of numerous multi-phase motors, such as a permanent magnet synchronous motor (PMSM), a brushless direct current (BLDC) motor, or as an asynchronous motor, just to name a few The rotor 114 is configured to rotate upon a torque being applied thereto. As is generally known, when the stator windings 116 are energized, a torque is generated and applied to the rotor 114. The rotor 114 thus rotates in the direction and speed of the applied torque. Although the rotor 114 may be variously configured and implemented, in one particular embodiment, such as the embodiment depicted in FIG. 2, the rotor 114 is implemented as a permanent magnet rotor.

Figure 2:
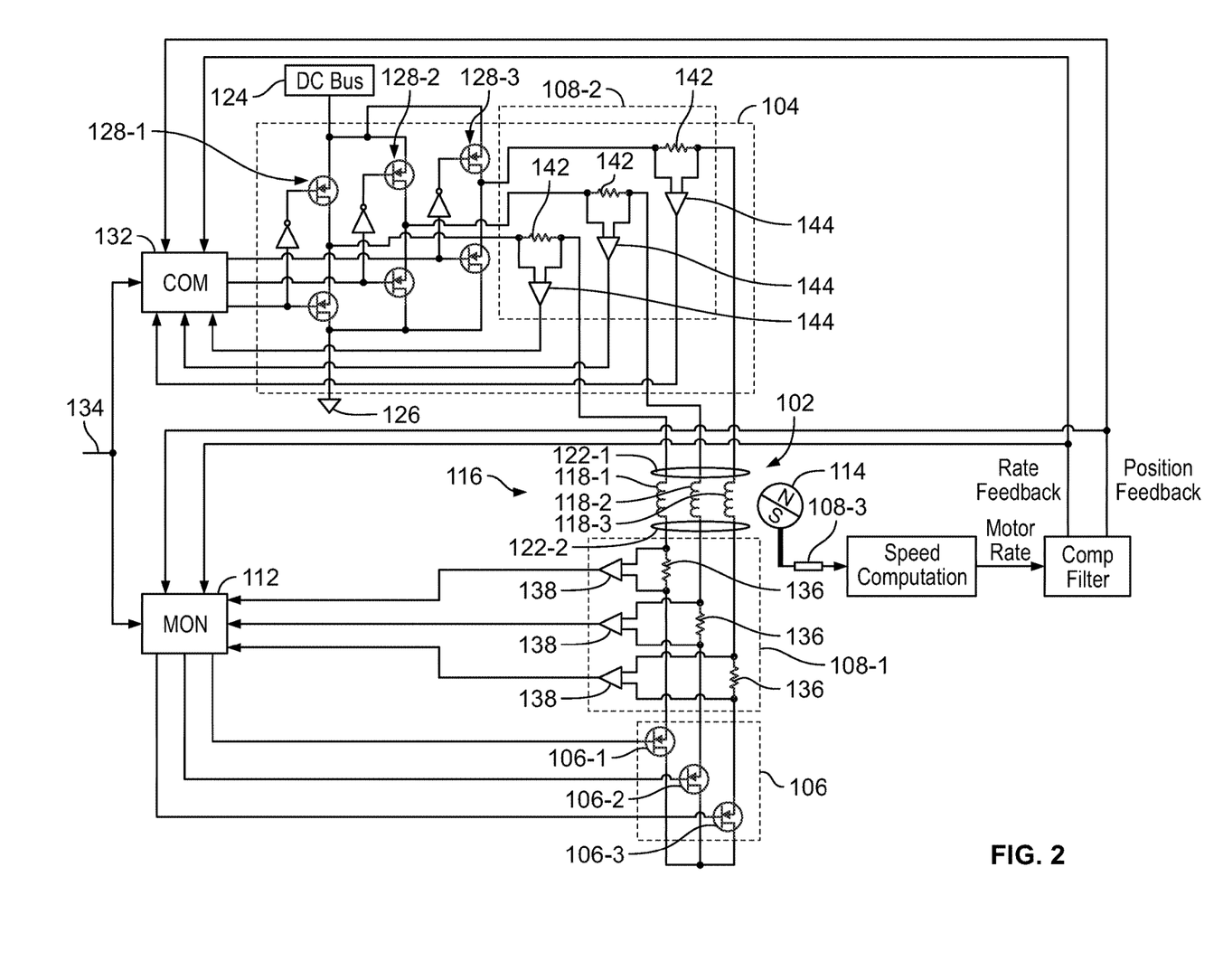
FIG. 2 depicts one particular implementation of the motor control system depicted in FIG. 1.

The multi-phase stator 116 is implemented with a plurality of individual, electrically isolated stator windings, and each stator winding is associated with a different phase. It will be appreciated that the stator 116 may be variously configured and implemented, but in one particular embodiment, such as the one depicted in FIG. 2, the multi-phase stator includes three individual, electrically isolated stator windings 118 (e.g., 118-1, 118-2, 118-3). Each stator winding 118 includes two terminals 122, a first terminal 122-1 and a second terminal 122-2. It will be appreciated that the stator windings 118 may be configured as three-phase wye windings, as depicted in FIG. 2, or as three-phase delta windings.

The multi-phase inverter circuit 104 is coupled to the first terminal 122-1 of each of the stator windings 118. The multi-phase inverter circuit 104 is responsive to motor command signals to controllably couple the first terminal 112-1 of one or more of the stator windings 118 to either a power source 124 or a circuit common node 126, to thereby energize one or more of the stator windings 118. The multi-phase inverter circuit 104 may be configured as any one of numerous known inverter topologies to implement this functionality. In one particular embodiment, such as the one depicted in FIG. 2, the multi-phase inverter circuit 104 includes a plurality of series-connected switches 128 and a controller 132. More specifically, it includes a first pair of series-connected switches 128-1, a second pair of series-connected switches 128-2, and a third pair of series-connected switches 128-3, where the first terminal 112-1 of each stator winding 118 is connected between a different one of the first, second, and third pair of series-connected switches 128. In the embodiment depicted in FIG. 2, the series-connected switches 128 are each implemented using suitable field effect transistors (FETs), but could also be implemented using any one of numerous other suitable switch devices, now known or developed in the future.

The controller 132 is coupled to receive motor command signals 134 and feedback signals from one or more of the sensors 108. The controller 132 is configured, in response to the motor command signal 134 and the feedback signals, to command the series-connected switches 128, using any one of numerous know commutation schemes, to controllably couple the first terminal 112-1 of one or more of the stator windings 118 to either the power source 124 or the circuit common node 126. The controller 132 may be implemented using one or more processors and computer-readable storage devices or media encoded with programming instructions for configuring the controller 132. The one or more processors may be any custom-made or commercially available processor, a central processing unit (CPU), a graphics processing unit (GPU), an application specific integrated circuit (ASIC), a field programmable gate array (FPGA), a digital signal controller (DSC), an auxiliary processor among several processors associated with the controller, a semiconductor-based microprocessor (in the form of a microchip or chip set), any combination thereof, or generally any device for executing instructions.

The computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller 132.

The controllable switches 106 are each associated with a different one of the second terminals 122-2, and each controllable switch 106 is electrically coupled in series between its associated second terminal 122-2 and a common winding node 128. In the depicted embodiment, the system 100 includes three controllable switches 106-1, 106-2, 106-3, and each is responsive to switch commands to operate in either a first switch mode or a second switch mode. In the first switch mode, each controllable switch 106 electrically couples the second terminal 122-2 of its associated stator winding 118 to the common winding node 128. In the second switch mode, each controllable switch 106 electrically isolates the second terminal 122-2 of its associated stator winding 118 from the common winding node 128. The controllable switches 106 may be implemented using any one of numerous types of switches, including any one of numerous types of manually-actuated switches, any one of numerous types of electromechanical switches (e.g., relays, contactors, etc.), any one of numerous types of solid state semiconductor switches (e.g., MOSFETs, FETs, bipolar transistors, etc.), or various combinations thereof, or any other suitable type of switch now known or developed in the future.

Each of the sensors 108 is configured to sense a motor state variable and supply a sensor signal representative of the sensed motor state variable to at least the monitor circuit 112. In some instances, one or more of the sensed motor state variables may also be supplied to the multi-phase inverter circuit 104. The plurality of sensors 108 may vary in type, location, and configuration. In one particular embodiment, the sensors 108 include at least a plurality of monitor circuit current sensors 108-1 and a plurality of inverter circuit current sensors 108-2, but may also include a position sensor 108-3 (see FIG. 2), and a speed sensor (not depicted), just to name a few. Each of the current sensors 108-1, 108-2 is configured to sense current flow through a different one of the stator windings 118-1, 118-2, 118-3, and supplies signals representative thereof. As depicted, the monitor current sensors 108-1 supply the signals to the monitor circuit 112, and the inverter current sensors 108-2 supply the signals to the multi-phase inverter circuit 104. The position sensor 108-3, when included, senses the rotational position of the rotor 114, and supplies position feedback signals to the multi-phase inverter circuit 104 and the monitor circuit 112. The speed sensor, when included, senses the rotational speed of the rotor 114, and supplies speed (or rate) feedback signals to the multi-phase inverter circuit 104 and the monitor circuit 112. In some embodiments, such as the one depicted in FIG. 2, the speed feedback signal may be derived from the position feedback signal. It will be appreciated that the sensors 108 can be disposed internally or externally to the motor, be implemented as part of the multi-phase inverter circuit 104 and/or the monitor circuit 112, or be implemented as a completely separate circuit, or various combinations thereof.

The current sensors 108-1, 108-2, the speed sensor, and the position sensor may all be implemented using any one of numerous types of suitable sensors, now known or developed in the future. In one particular embodiment, such as the one depicted in FIG. 2, each monitor circuit current sensor 108-1 includes a resistor 136 and an operational amplifier 138. Each resistor 136 is connected in series between a different one of the controllable switches 106 and a different one of the second terminals 122-2. The voltage drop across each resistor 136, which is directly proportional to the current flow therethrough, and thus the current flow in its respective winding 118, is supplied to the associated operational amplifier 138, which supplies a signal representative of the current flow to the monitor circuit 112. Similarly, each inverter circuit current sensor 108-2 includes a resistor 142 and an operational amplifier 144. Each resistor 142 is connected in series between a different one of the series-connected switches 128 and a different one of the first terminals 122-1. The voltage drop across each resistor 142, which is directly proportional to the current flow therethrough, and thus the current flow in its respective winding 118, is supplied to the associated operational amplifier 144, which supplies a signal representative of the current flow to the multi-phase inverter circuit 104, and may also, in some embodiments, supply the signals to the monitor circuit 112.

The monitor circuit 112 is coupled to each of the controllable switches 106 and to each of the sensors 108, and also receives the motor commands 134. As FIG. 1 also depicts, the monitor circuit 112 may also, in some embodiments, be in operable communication with the multi-phase inverter circuit 104. The monitor circuit 112 is responsive to each of the sensor signals to determine when one or more of the sensed motor state variables attains a predetermined threshold magnitude. For example, the monitor circuit 112 may be configured to determine when the current flow through one or more of the stator windings 118 is too high or too low. The monitor circuit 112 may also or instead be configured to determine when motor speed is too high or too low, and/or when motor position deviates too much from the commanded motor position.

When none of the sensed motor state variables has attained the predetermined threshold magnitude, the monitor circuit 112 supplies a switch command each of the controllable switches 106 that causes each of the controllable switches 106 to operate in the first switch mode, to thereby electrically couple the second terminal 122-2 of its associated stator winding 118 to the common winding node 128. However, when one or more of the sensed motor state variables does attain its predetermined threshold magnitude, the monitor circuit 112 supplies a switch command to one or more of the controllable switches 106 that causes the one or more controllable switches 106 to operate in the second switch mode, to thereby electrically isolate the second terminal 122-2 of its associated stator winding 118 from the common winding node 128. The monitor circuit 112 may also, in some embodiments, transmit a signal to the multi-phase inverter circuit 104 indicating which of the one or more controllable switches 106 has been commanded to operate in the second switch mode. In response to this signal, the multi-phase inverter circuit 104 can appropriately adjust the control algorithm. In other embodiments, the multi-phase inverter circuit 104 may be configured to automatically adjust the control algorithm without this signal.

The monitor circuit 112 may be implemented using one or more processors and computer-readable storage devices or media encoded with programming instructions for configuring the monitor circuit 112. The one or more processors may be any custom-made or commercially available processor, a central processing unit (CPU), a graphics processing unit (GPU), an application specific integrated circuit (ASIC), a field programmable gate array (FPGA), a digital signal controller (DSC), an auxiliary processor among several processors associated with the controller, a semiconductor-based microprocessor (in the form of a microchip or chip set), any combination thereof, or generally any device for executing instructions.

The computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the monitor circuit 112.

Figure 3:
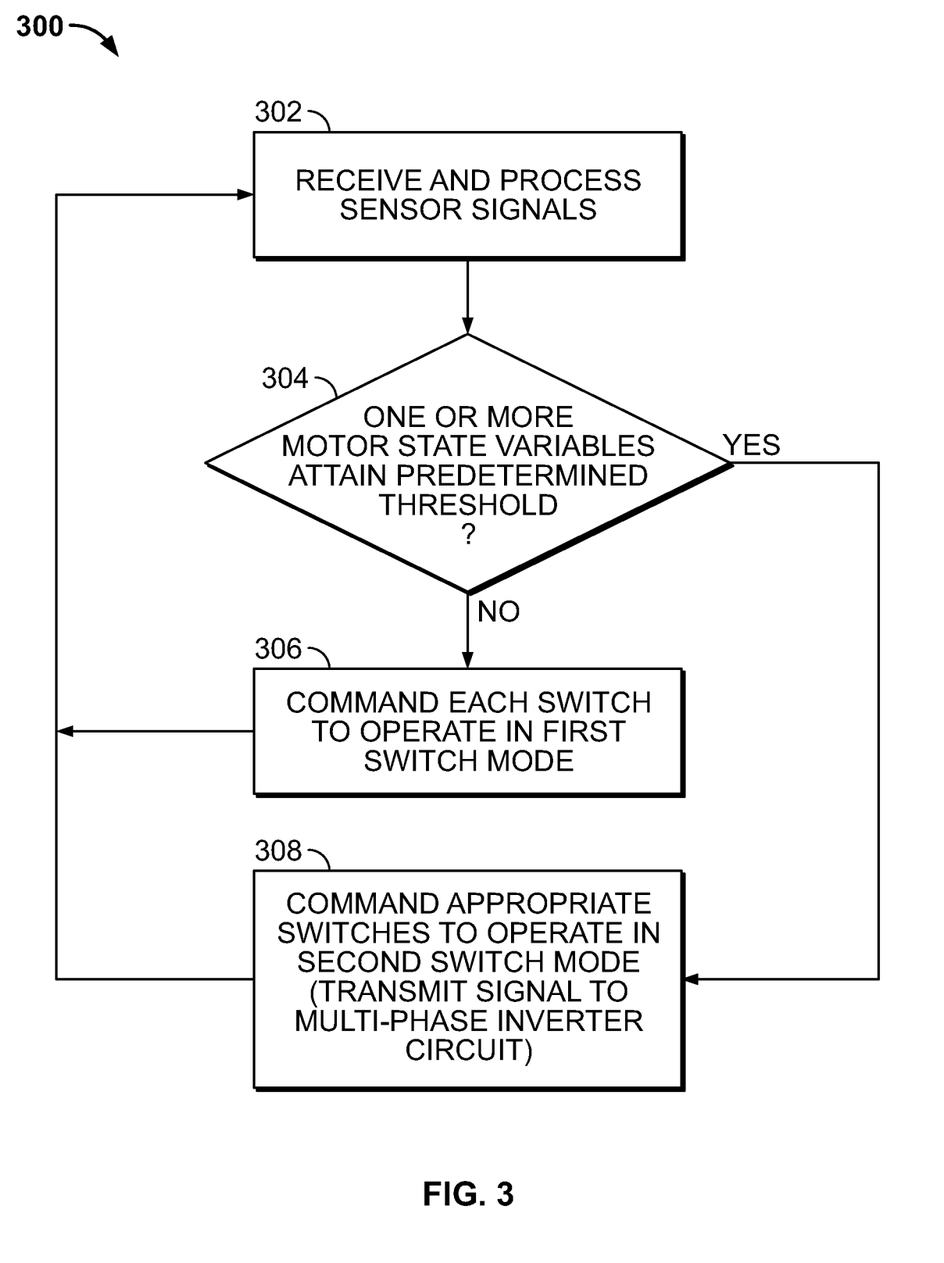
FIG. 3 depicts a process flowchart of an example process that may be implemented in the motor control systems of FIGS. 1 and 2.

The above-described process that is implemented in the monitor circuit 112 is depicted in flowchart form in FIG. 3 and, for completeness, will now be described. In doing so, it should be noted that the order of operation within the process 300 is not limited to the sequential execution as illustrated in the figure, but may be performed in one or more varying orders as applicable and in accordance with the present disclosure.

The example process 300 includes receiving processing the sensors signals 302, and then determining if one or more of the sensed motor state variables has attained its predetermined threshold magnitude 304. When none of the sensed motor state variables has attained the predetermined threshold magnitude (e.g., NO at task 304), the monitor circuit 112 commands each of the controllable switches to operate in the first switch mode (306), and the process repeats. However, when one or more of the sensed motor state variables does attain its predetermined threshold magnitude, the monitor circuit 112 commands the appropriate controllable switches 106 to operate in the second switch mode (308), and the process repeats. As noted above, in some embodiments the monitor circuit 112 may also transmit a signal to the multiphase inverter circuit 104 indicating which of the one or more controllable switches 106 has been commanded to operate in the second switch mode.

The system and method described herein allows the motor 102 to be commutated with degraded performance using only two stator windings 118, and does so without increasing system complexity, weight, and size relative to know motor control systems.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A motor control system, comprising:
   a multi-phase motor including a rotor and a plurality of stator windings, each stator winding associated with a different phase, each stator winding including a first terminal and a second terminal;
   a multi-phase inverter circuit coupled to the first terminal of each of the stator windings, the multi-phase inverter circuit responsive to motor command signals to controllably couple the first terminal of one or more of the stator windings to either a power source or a circuit common node;
   a plurality of controllable switches, each controllable switch associated with a different one of the second terminals, each controllable switch electrically coupled in series between its associated second terminal and a common winding node, each controllable switch responsive to switch commands to operate in either a first switch mode, in which each controllable switch electrically couples the second terminal of its associated stator winding to the common winding node, or a second switch mode, in which each controllable switch electrically isolates the second terminal of its associated stator winding from the common winding node;
   a plurality of sensors, each sensor configured to sense a motor state variable and supply a sensor signal representative of the sensed motor state variable; and
   a monitor circuit coupled to each of the controllable switches and to each of the sensors, the monitor circuit responsive to each of the sensor signals to:
      determine when one or more of the sensed motor state variables attains a predetermined threshold magnitude, and
      when one or more of the sensed motor state variables attains the predetermined threshold magnitude, to supply a switch command to one or more of the controllable switches that causes the one or more controllable switches to operate in the second switch mode.

2. The motor control system of claim 1, wherein:
   when none of the sensed motor state variables has attained the predetermined threshold magnitude, the monitor circuit supplies a switch command each of the controllable switches that causes each of the controllable switches to operate in the first switch mode.

3. The motor control system of claim 1, wherein the inverter circuit comprises:
   a first pair of series-connected switches;
   a second pair of series-connected switches; and
   a third pair of series-connected switches.

4. The motor control system of claim 3, wherein the first terminal of each stator winding is connected between a different one of the first, second, and third pair of series-connected switches.

5. The motor control system of claim 1, wherein the plurality of sensors includes one or more of a plurality of current sensors, a speed sensor, and a position sensor.

6. The motor control system of claim 5, wherein:
   the plurality of sensors includes a plurality of current sensors;
   each current sensor includes a resistor and an operational amplifier;
   each resistor is connected in series between a different one of the controllable switches and a different one of the second terminals.

7. The motor control system of claim 1, wherein the multi-phase motor is a permanent magnet synchronous motor.

8. The motor control system of claim 1, wherein the multi-phase motor is a brushless DC motor.

9. The motor control system of claim 1, wherein the multi-phase motor is an asynchronous motor.

10. The motor control system of claim 1, wherein the plurality of stator windings are configured as three-phase wye windings.

11. The motor control system of claim 1, wherein the plurality of stator windings are configured as three-phase delta windings.

12. A motor control system, comprising:
   a three-phase motor including a rotor and a plurality of stator windings, each stator winding associated with a different phase, each stator winding including a first terminal and a second terminal;
   a three-phase inverter circuit coupled to the first terminal of each of the stator windings, the three-phase inverter circuit responsive to motor command signals to controllably couple the first terminal of one or more of the stator windings to either a power source or a circuit common node;
   a plurality of controllable switches, each controllable switch associated with a different one of the second terminals, each controllable switch electrically coupled in series between its associated second terminal and a common winding node, each controllable switch responsive to switch commands to operate in either a first switch mode, in which each controllable switch electrically couples the second terminal of its associated stator winding to the common winding node, or a second switch mode, in which each controllable switch electrically isolates the second terminal of its associated stator winding from the common winding node;
   a plurality of sensors, each sensor configured to sense a motor state variable and supply a sensor signal representative of the sensed motor state variable; and
   a monitor circuit coupled to each of the controllable switches and to each of the sensors, the monitor circuit responsive to each of the sensor signals to determine when one or more of the sensed motor state variables attains a predetermined threshold magnitude and:
      (i) when none of the sensed motor state variables has attained the predetermined threshold magnitude, to supply a switch command each of the controllable switches that causes each of the controllable switches to operate in the first switch mode, and
      (ii) when one or more of the sensed motor state variables attains the predetermined threshold magnitude, to supply a switch command to one or more of the controllable switches that causes the one or more controllable switches to operate in the second switch mode.

13. The motor control system of claim 12, wherein the three-phase inverter circuit comprises:
   a first pair of series-connected switches;
   a second pair of series-connected switches; and
   a third pair of series-connected switches.

14. The motor control system of claim 13, wherein the first terminal of each stator winding is connected between a different one of the first, second, and third pair of series-connected switches.

15. The motor control system of claim 12, wherein the plurality of sensors includes one or more of a plurality of current sensors, a speed sensor, and a position sensor.

16. The motor control system of claim 15, wherein:
   the plurality of sensors includes a plurality of current sensors;
   each current sensor includes a resistor and an operational amplifier;
   each resistor is connected in series between a different one of the controllable switches and a different one of the second terminals.

17. The motor control system of claim 12, wherein the multi-phase motor is a permanent magnet synchronous motor.

18. The motor control system of claim 12, wherein the multi-phase motor is a brushless DC motor.

19. The motor control system of claim 12, wherein the multi-phase motor is an asynchronous motor.

20. A motor control system, comprising:
   a three-phase motor including a rotor and a plurality of stator windings, each stator winding associated with a different phase, each stator winding including a first terminal and a second terminal;
   a three-phase inverter circuit coupled to the first terminal of each of the stator windings, the three-phase inverter circuit responsive to motor command signals to controllably couple the first terminal of one or more of the stator windings to either a power source or a circuit common node, the three-phase inverter circuit including a first pair of series-connected switches, a second pair of series-connected switches, and a third pair of series-connected switches, the first terminal of each stator winding connected between a different one of the first, second, and third pair of series-connected switches;
   a plurality of controllable switches, each controllable switch associated with a different one of the second terminals, each controllable switch electrically coupled in series between its associated second terminal and a common winding node, each controllable switch responsive to switch commands to operate in either a first switch mode, in which each controllable switch electrically couples the second terminal of its associated stator winding to the common winding node, or a second switch mode, in which each controllable switch electrically isolates the second terminal of its associated stator winding from the common winding node;
   a plurality of sensors, each sensor configured to sense a motor state variable and supply a sensor signal representative of the sensed motor state variable; and a monitor circuit coupled to each of the controllable switches and to each of the sensors, the monitor circuit responsive to each of the sensor signals to determine when one or more of the sensed motor state variables attains a predetermined threshold magnitude and:
  (i) when none of the sensed motor state variables has attained the predetermined threshold magnitude, to supply a switch command each of the controllable switches that causes each of the controllable switches to operate in the first switch mode, and
  (ii) when one or more of the sensed motor state variables attains the predetermined threshold magnitude, to supply a switch command to one or more of the controllable switches that causes the one or more controllable switches to operate in the second switch mode.

* * * * *